(12) United States Patent
Jeong et al.

(10) Patent No.: US 10,175,530 B2
(45) Date of Patent: Jan. 8, 2019

(54) BACKLIGHT UNIT, DISPLAY DEVICE HAVING THE SAME, AND DIGITAL INFORMATION DISPLAY SYSTEM HAVING DISPLAY DEVICES

(71) Applicant: Samsung Display Co., Ltd., Yongin-Si, Gyeonggi-Do (KR)

(72) Inventors: Seongkoo Jeong, Cheonan-si (KR); Byungjin Park, Seongnam-si (KR); Jungil Lee, Seoul (KR); Jiheon Lee, Busan (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/283,480

(22) Filed: Oct. 3, 2016

(65) Prior Publication Data

US 2017/0123274 A1 May 4, 2017

(30) Foreign Application Priority Data

Oct. 28, 2015 (KR) .......................... 10-2015-0150462

(51) Int. Cl.
G02F 1/1333 (2006.01)
G02F 1/1335 (2006.01)
G02F 1/1345 (2006.01)

(52) U.S. Cl.
CPC .... *G02F 1/133611* (2013.01); *G02F 1/13336* (2013.01); *G02F 1/133308* (2013.01); *G02F 1/133603* (2013.01); *G02F 1/133606* (2013.01); *G02F 1/133608* (2013.01); *G02F 1/13452* (2013.01); *G02F 1/133602* (2013.01); *G02F 2001/133317* (2013.01); *G02F 2201/465* (2013.01)

(58) Field of Classification Search
CPC ......... G02F 1/133611; G02F 1/133603; G02F 1/133606; G02F 1/133608; G02F 1/13336
See application file for complete search history.

(56) References Cited

U.S. PATENT DOCUMENTS

2001/0002145 A1 5/2001 Lee et al.
2004/0008512 A1 1/2004 Kim
(Continued)

FOREIGN PATENT DOCUMENTS

JP 2004-029663 A 1/2004
WO 2015/160103 A1 10/2015

OTHER PUBLICATIONS

European Search Report for European Patent Application No. 16195832.7 dated Mar. 15, 2017.

*Primary Examiner* — Alexander K Garlen
(74) *Attorney, Agent, or Firm* — Cantor Colburn LLP

(57) ABSTRACT

A backlight unit includes a bottom cover, a light source, a middle mold, a diffusion plate and an optical sheet. The bottom cover defines a bottom portion and a sidewall portion which is protruded from the bottom portion. The light source is accommodated in the bottom cover. The middle mold is supported by the bottom cover and defines a horizontal supporting portion and a distance maintaining portion extending from a first end of the horizontal supporting portion in a direction perpendicular to the bottom portion. The diffusion plate overlaps the horizontal supporting portion. The optical sheet overlaps the distance maintaining portion and is spaced apart from the diffusion plate.

23 Claims, 10 Drawing Sheets

(56) References Cited

U.S. PATENT DOCUMENTS

| | | | |
|---|---|---|---|
| 2007/0210694 A1* | 9/2007 | Kim | G02F 1/133608 |
| | | | 313/493 |
| 2009/0010025 A1 | 1/2009 | Okita | |
| 2010/0014025 A1* | 1/2010 | Teragawa | G02F 1/133606 |
| | | | 349/64 |
| 2010/0302493 A1 | 12/2010 | Yang et al. | |
| 2012/0050645 A1* | 3/2012 | Okada | G02F 1/133611 |
| | | | 349/64 |
| 2014/0184985 A1* | 7/2014 | Liu | G02F 1/133602 |
| | | | 349/61 |
| 2014/0204281 A1 | 7/2014 | Maeda | |
| 2014/0320778 A1 | 10/2014 | Tang et al. | |
| 2015/0016090 A1* | 1/2015 | Lee | G02F 1/133608 |
| | | | 362/97.1 |
| 2016/0011453 A1* | 1/2016 | Yoon | G02F 1/133608 |
| | | | 349/58 |

\* cited by examiner

| Measuring Position | Ratio of brightness of measuring position to brightness of center position |
|---|---|
| First Position ■ | 91.5% |
| Second Position ▲ | 85.4% |
| Third Position ● | 78.8% |
| Fourth Position ⊂⊃ | 81.3% |

BACKLIGHT UNIT, DISPLAY DEVICE HAVING THE SAME, AND DIGITAL INFORMATION DISPLAY SYSTEM HAVING DISPLAY DEVICES

This application claims priority to Korean Patent Application No. 10-2015-0150462, filed on Oct. 28, 2015, and all the benefits accruing therefrom under 35 U.S.C. § 119, the content of which in its entirety is herein incorporated by reference.

BACKGROUND

1. Field

The invention relates to a backlight unit, a display device having the same, and a digital information display ("DID") system having a plurality of the display devices. More particularly, the invention relates to a backlight unit having improved brightness uniformity, a display apparatus having the backlight unit, and a DID system having a plurality of the display devices.

2. Description of the Related Art

In general, a display device is classified into a self-emissive type display device that self-emits a light and a non-self-emissive type display device that requires a separate light source to emit the light. As the non-self-emissive type display device, various display devices, such as a liquid crystal display device, an electrophoretic display device, an electrowetting display device, etc., are used.

The non-self-emissive type display device includes a display panel controlling a transmittance of the light incident thereto and a backlight unit which generates and provides the light to the display panel.

As the market demand for narrow bezel display panels continues to increase, a width of a non-display area of the display panels (otherwise referred to as a bezel) is reduced. Due to the reduction in width of the bezel, an available space is insufficient to accommodate components of the backlight unit which generates and provides light to the display panels.

SUMMARY

One or more exemplary embodiment of the invention provides a backlight unit having improved brightness uniformity.

One or more exemplary embodiment of the invention provides a display device including the backlight unit.

One or more exemplary embodiment of the invention provides a digital information display ("DID") system including a plurality of the display devices including the backlight unit.

Exemplary embodiments of the invention provide a display device including a display panel and a backlight unit.

The backlight unit is disposed under the display panel.

The backlight unit includes a bottom cover, a light source, a middle mold, a diffusion plate and an optical sheet.

The bottom cover defines a bottom portion thereof and a sidewall portion thereof which is protruded from the bottom portion.

The light source is accommodated in the bottom cover.

The middle mold is supported by the bottom cover and defines a horizontal supporting portion and a distance maintaining portion extending from a first end of the horizontal supporting portion in a direction perpendicular to the bottom portion.

The diffusion plate overlaps the horizontal supporting portion.

The optical sheet overlaps the distance maintaining portion and is spaced apart from the diffusion plate.

The horizontal supporting portion may be parallel to the bottom portion.

The distance maintaining portion may be spaced apart from the diffusion plate in a direction parallel to the bottom portion.

The horizontal supporting portion may extend bent at the first end thereof to define the distance maintaining portion extending in the direction perpendicular to the bottom portion of the bottom cover.

The display panel may be disposed on the optical sheet and an upper surface of the optical sheet may contact the display panel.

The horizontal supporting portion of the middle mold may extend bent at the first end thereof to define the distance maintaining portion extending in the direction perpendicular to the bottom portion of the bottom cover; the horizontal supporting portion may extend bent at a second end thereof opposite to the first end to define an inclined portion of the middle mold extending inclined with respect to the horizontal supporting portion; the inclined portion may extend bent at a distal end thereof to define a vertical supporting portion of the middle mold extending perpendicular to the bottom portion of the bottom cover; and the distance maintaining portion may extend bent at a distal end thereof to define an expansion portion of the middle mold extending parallel to the bottom portion of the bottom cover.

The horizontal supporting portion of the middle mold may extend bent at the first end thereof to define the distance maintaining portion extending in the direction perpendicular to the bottom portion of the bottom cover; the horizontal supporting portion may extend bent at a second end thereof opposite to the first end to define an inclined portion of the middle mold extending inclined over an entirety thereof at a constant slope to the bottom portion of the bottom cover; and the distance maintaining portion may extend bent at a distal end thereof to define an expansion portion of the middle mold extending parallel to the bottom portion of the bottom cover.

The horizontal supporting portion of the middle mold may extend bent at the first end thereof to define the distance maintaining portion extending in the direction perpendicular to the bottom portion of the bottom cover; the horizontal supporting portion may extend bent at a second end thereof opposite to the first end to define an inclined portion of the middle mold having a curved shape extending toward the bottom portion of the bottom cover; and the distance maintaining portion may extend bent at a distal end there of to define an expansion portion of the middle mold extending parallel to the bottom portion.

The horizontal supporting portion of the middle mold may extend bent at the first end thereof to define the distance maintaining portion extending in the direction perpendicular to the bottom portion of the bottom cover; the horizontal supporting portion may extend bent at a second end thereof opposite to the first end to define a vertical supporting portion of the middle mold extending perpendicular to the bottom portion; and the distance maintaining portion may extend bent at a distal end there of to define an expansion portion of the middle mold extending parallel to the bottom portion of the bottom cover.

The bottom portion may have a quadrangular shape. The bottom portion may extend bent from each of four sides thereof to define the sidewall portion including first, second, third, and fourth sidewalls, respectively. At least one of the first to fourth sidewalls may form an obtuse angle with the bottom portion.

The display device may further include a holder disposed on an outer surface of the bottom cover. The first sidewall may form the obtuse angle with the bottom portion and the holder is coupled with the first sidewall.

A plurality of holes may be defined in the first sidewall which forms the obtuse angle with the bottom portion. A portion of the holder may extend into the holes to fix the holder to the first sidewall.

The display device may further include a printed circuit board electrically connected to the display panel and a flexible printed circuit board electrically connecting the display panel and the printed circuit board to each other. The flexible printed circuit board may be bent from the display panel and toward the first sidewall which forms the obtuse angle with the bottom portion to dispose the printed circuit board in the holder.

Among the first, second, third and fourth sidewalls of the bottom cover for which the first sidewall forms the obtuse angle with the bottom portion, the first and second sidewalls are adjacent to each other and the third and fourth sidewalls are adjacent to each other, the distance maintaining portion may not directly contact the first and second sidewalls adjacent to each other and the distance maintaining portion may directly contact the third and fourth sidewalls adjacent to each other.

The display device may include a display area having a quadrangular shape defining four sides of the display area and first, second, third, and fourth non-display areas of which lengths thereof are extended along the four sides of the display area. The first to fourth non-display areas may be respectively overlapped with the first to fourth sidewalls. Widths of the first and second non-display areas may each be greater than widths of the third and fourth non-display areas.

The width of the first non-display area may be equal to the width of the second non-display area and the width of the third non-display area may be equal to the width of the fourth non-display area.

A sum of the width of the first non-display area and the width of the third non-display area may be equal to a sum of the width of the second non-display area and the width of the fourth non-display area.

The display device may further include a top cover covering an edge of the display panel and coupled with the backlight unit.

The display device may further include a spacer disposed between the top cover and the display panel and disposed along an edge of the display panel.

Exemplary embodiments of the invention provide a backlight unit including a bottom cover, a light source, a middle mold, a diffusion plate and an optical sheet.

The bottom cover defines a bottom portion thereof and a sidewall portion thereof protruded from the bottom portion.

The light source is accommodated in the bottom cover and generates light used by a display panel to display an image.

The middle mold is supported by the bottom cover and supports the display panel thereon, the middle mold including a horizontal supporting portion and a distance maintaining portion extending from a first end of the horizontal supporting portion in a direction perpendicular to the bottom portion.

The diffusion plate overlaps the horizontal supporting portion.

The optical sheet overlaps the distance maintaining portion and is spaced apart from the diffusion plate.

Exemplary embodiments of the invention provide a digital information display ("DID") system including a plurality of display devices arranged in a matrix form of M rows by N columns (each of M and N is a natural number) along a first direction and a second direction perpendicular to the first direction.

Each of the display devices includes a display panel and a backlight unit. The backlight unit is disposed under the display panel and provides light to the display panel.

The backlight unit includes a bottom cover, a light source, a middle mold, a diffusion plate and an optical sheet.

The bottom cover defines a bottom portion thereof and a sidewall portion thereof protruded from the bottom portion. The light source is accommodated in the bottom cover. The middle mold is supported by the bottom cover and defines a horizontal supporting portion and a distance maintaining portion extending from a first end of the horizontal supporting portion in a direction perpendicular to the bottom portion. The diffusion plate overlaps the horizontal supporting portion. The optical sheet overlaps the distance maintaining portion and is spaced apart from the diffusion plate.

Each of the display devices may include a display area having a rectangular shape defining four sides of the display area and a non-display area disposed adjacent to the four sides of the display area. A distance between display areas of two display devices adjacent to each other in the first direction may be equal to a distance between display areas of two display devices adjacent to each other in the second direction.

The horizontal supporting portion may extend bent at the first end thereof to define the distance maintaining portion extending in the direction perpendicular to the bottom portion of the bottom cover.

According to one or more exemplary embodiment of the invention, the backlight unit which provides light to a display panel, the display device including the backlight unit, and the DID system including the display device in plural may improve the brightness uniformity of the display area of the display panel.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
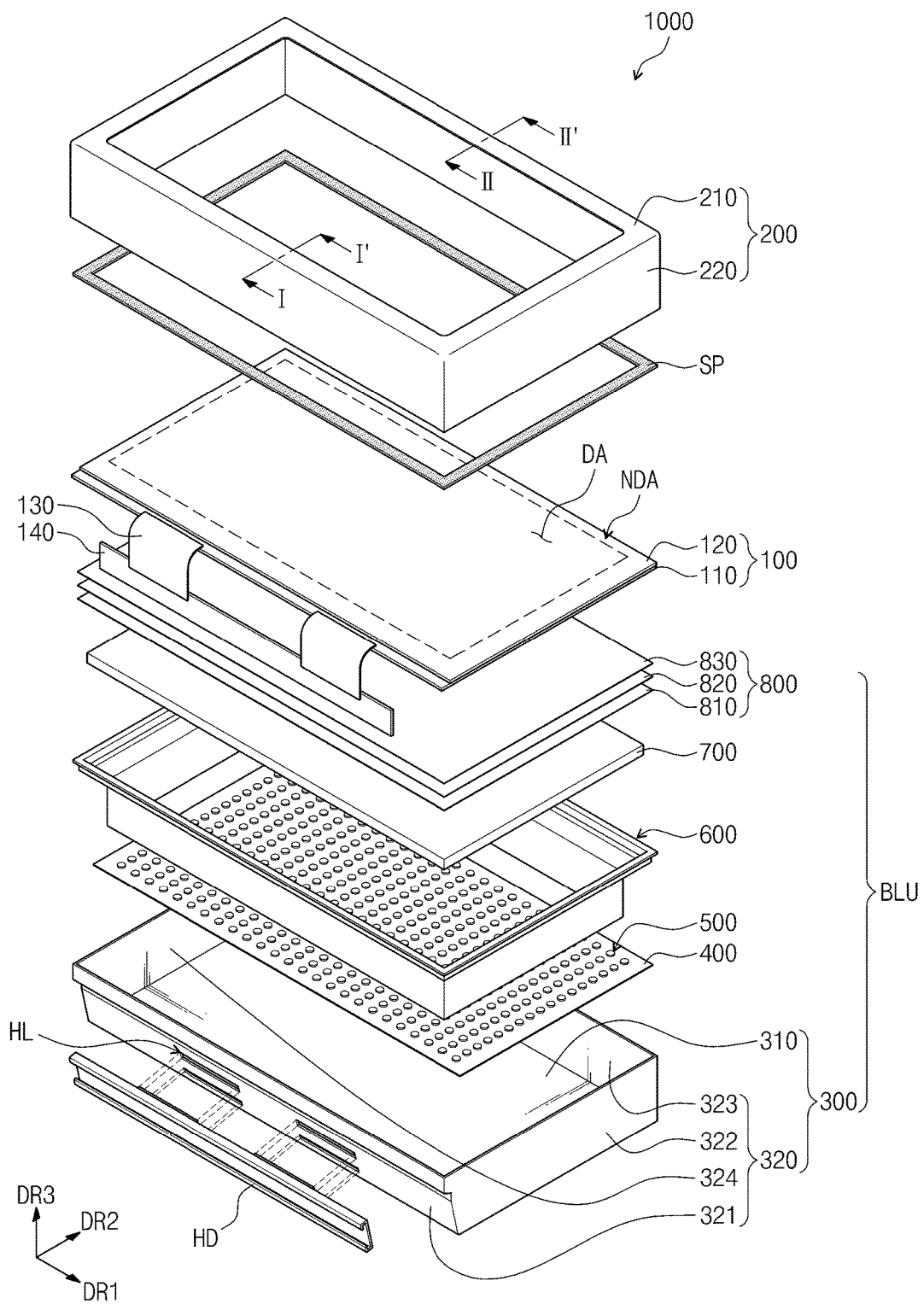
FIG. 1 is an exploded perspective view showing an exemplary embodiment of a display device according to the invention.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 2:
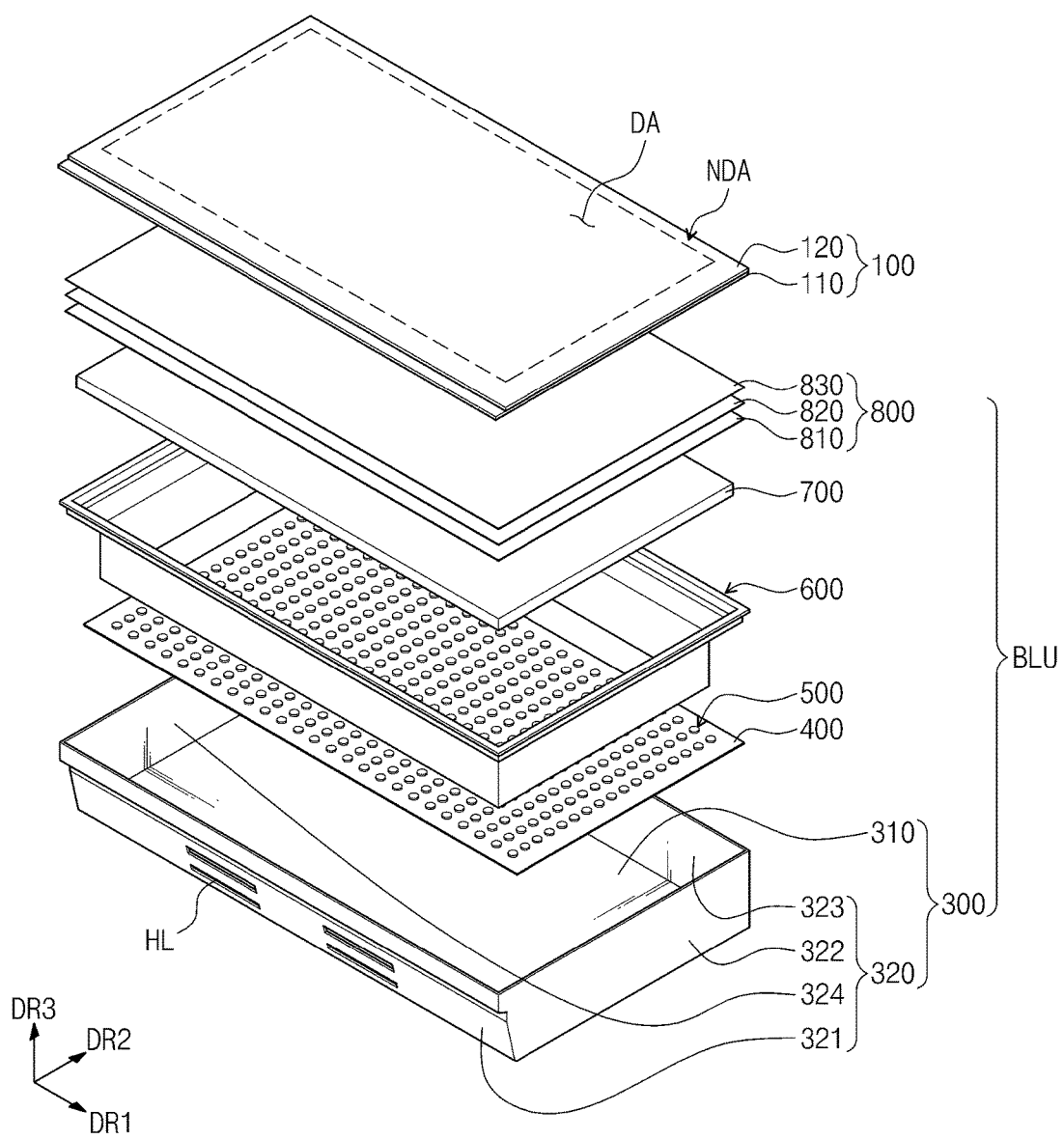
FIG. 2 is an exploded perspective view showing an exemplary embodiment of a display panel and a backlight unit of a display device according to the invention.

FIG. 1 is an exploded perspective view showing an exemplary embodiment of a display device 1000 according to the invention and FIG. 2 is an exploded perspective view showing an exemplary embodiment of a display panel and a backlight unit of a display device according to the invention.

Referring to FIG. 1, the display device 1000 includes a display panel 100, a top cover 200 and a backlight unit BLU.

The display panel 100 receives a light from the backlight unit BLU and displays an image with the light. The display panel 100 may be, but not limited to, a non-self-emissive type display panel, such as a liquid crystal display panel, and hereinafter, the liquid crystal display panel will be described as the display panel 100.

The display panel 100 includes a display area DA displaying the image and a non-display area NDA surrounding the display area DA and not displaying the image.

The display panel 100 includes a first substrate 110, a second substrate 120 facing the first substrate 110, and a liquid crystal layer interposed between the first and second substrates 110 and 120.

The first substrate 110 includes gate lines, data lines, thin film transistors and pixel electrodes therein such as on a base substrate thereof. The gate lines are insulated from the data lines while crossing the data lines. Each thin film transistor is a three-terminal element and is connected to one gate line, one data line and one pixel electrode. A data voltage applied to the data line is applied to the pixel electrode in response to a signal applied to the gate line.

The second substrate 120 is disposed to face the first substrate 110 such that the liquid crystal layer is disposed between the first and second substrates 110 and 120. The second substrate 120 includes a color filter and a common electrode therein such as on a base substrate thereof, but should not be limited thereto or thereby. According to another exemplary embodiment, at least one of the color filter and the common electrode may be disposed in the first substrate 110. According to another exemplary embodiment, the second substrate 120 is omitted, and the color filter, the common electrode and the liquid crystal layer are encapsulated by an insulating layer and may be disposed in the first substrate 110.

In a top plan view, the second substrate 120 has a size smaller than that of the first substrate 110. A portion of the first substrate 110 is exposed without being covered by the second substrate 120.

The liquid crystal layer includes liquid crystal molecules and an arrangement of the liquid crystal molecules is changed in accordance with an electric field formed between the first and second substrates 110 and 120.

In FIG. 1, the display panel 100 has a substantially rectangular shape in the top plan view. Relatively long sides of the display panel 100 extend lengthwise in a first direction DR1 and relatively short sides of the display panel 100 extend lengthwise in a second direction DR2 crossing the first direction DR1. A thickness direction of the display panel 100 is referred to as a third direction DR3. The third direction DR3 may be orthogonal to both the first and second direction DR1 and DR2.

The display device 1000 may further include a flexible printed circuit board 130 and a printed circuit board 140.

The flexible printed circuit board 130 is extended from the display panel 100 and bent to electrically connect the display panel 100 and the printed circuit board 140 to each other. One end of the flexible printed circuit board 130 is connected to one side portion of the first substrate 110, which is exposed without being covered by the second substrate 120, and the other (opposing) end of the flexible printed circuit board 130 is connected to the printed circuit board 140. The flexible printed circuit board 130 may be provided in a plural number. The flexible printed circuit boards 130 are spaced apart from each other in the first direction DR1. FIG. 1 shows two flexible printed circuit boards 130.

The printed circuit board 140 is coupled with the backlight unit BLU. The printed circuit board 140 applies a signal to the display panel 100 through the flexible printed circuit board 130 or receives a signal from the display panel 100.

In the illustrated exemplary embodiment, an integrated circuit chip (not shown) may be mounted on the flexible printed circuit board 130. The integrated circuit chip may include a data driving circuit. The flexible printed circuit board 130 may be a tape carrier package ("TCP") or a chip-on-film ("COF"), but should not be limited thereto or thereby. That is, the integrated circuit chip may be directly mounted on the first substrate 110.

The top cover 200 covers an edge of the display panel 100 and is coupled with the display panel 100 and the backlight unit BLU. The top cover 200 is provided with an opening formed therethrough to expose the display area DA of the display panel 100.

The top cover 200 includes a front surface cover 210 and a side surface cover 220. The front surface cover 210 covers an edge of an upper surface of the display panel 100. The side surface cover 220 covers a side surface of the display panel 100 and the backlight unit BLU.

The backlight unit BLU is disposed under the display panel 100 to provide the light to the display panel 100.

The backlight unit BLU includes a bottom cover 300, a reflective sheet 400, a light source 500 provided in plural (as a plurality of light sources 500), a middle mold 600, a diffusion plate 700 and optical sheets 800.

Figure 3:
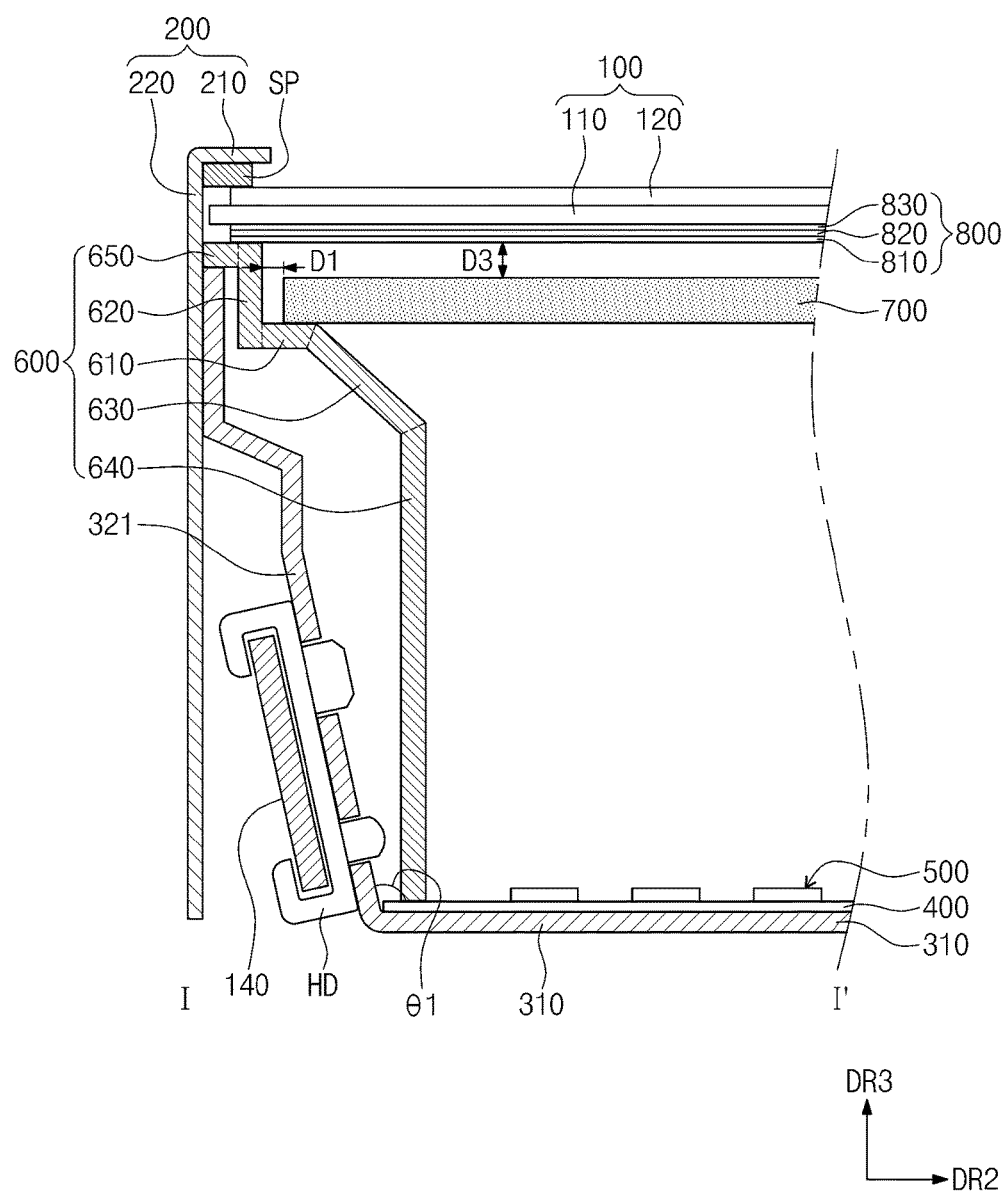
FIG. 3 is a cross-sectional view taken along line I-I' of FIG. 1.
Figure 4:
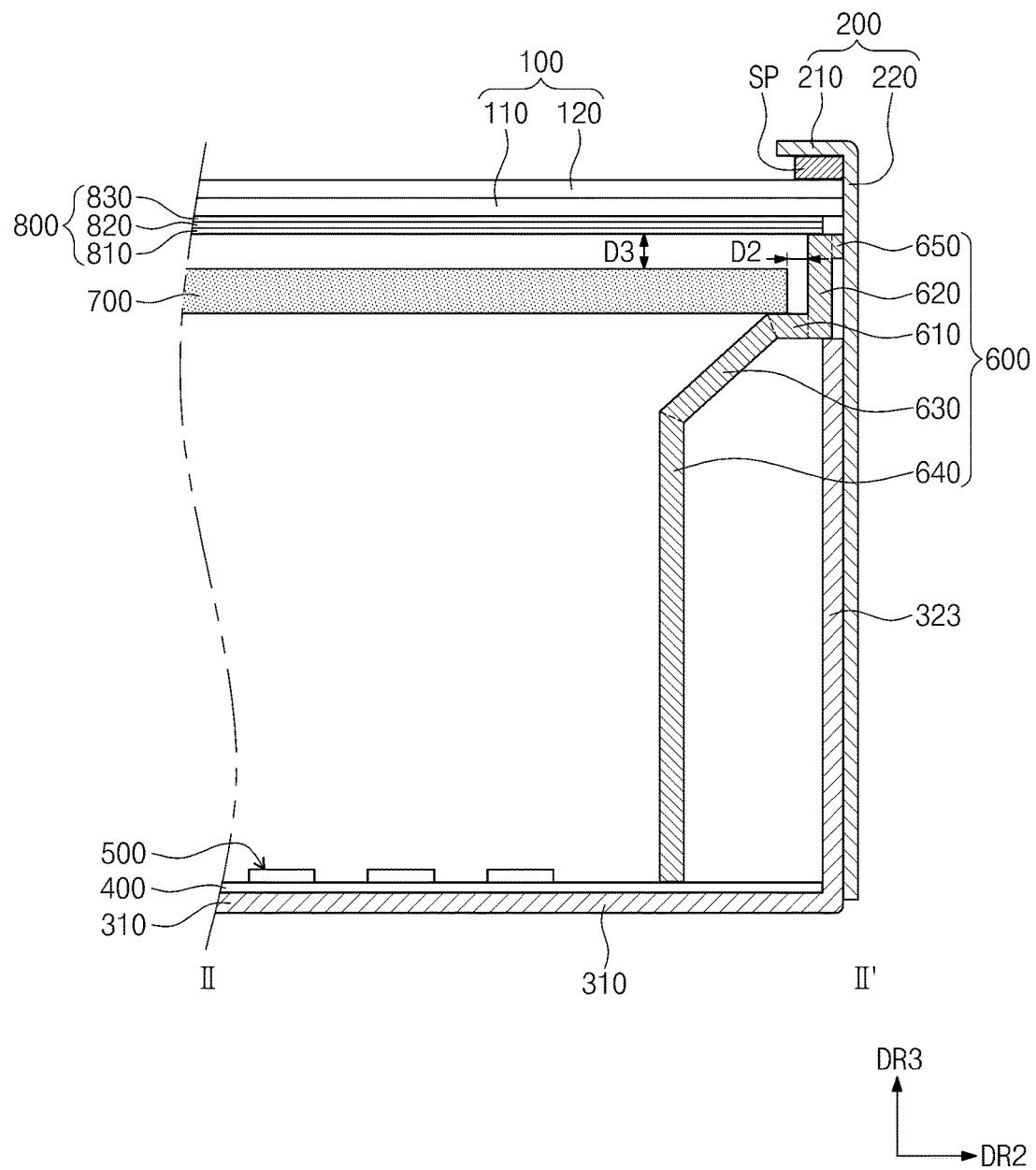
FIG. 4 is a cross-sectional view taken along line II-II' of FIG. 1.

FIG. 3 is a cross-sectional view taken along line I-I' of FIG. 1 and FIG. 4 is a cross-sectional view taken along line II-II' of FIG. 1.

Hereinafter, the backlight unit BLU will be described in detail with reference to FIGS. 1 to 4.

The bottom cover 300 includes a bottom portion 310 and a sidewall portion 320.

The bottom portion 310 is substantially flat. The bottom portion 310 has a substantially quadrangular shape in the top plan view.

The sidewall portion 320 is protruded and extends from an edge of the bottom portion 310. The sidewall portion 320 includes first to fourth sidewalls 321 to 324. The first to fourth sidewalls 321 to 324 are respectively connected to four sides of the bottom portion 310. The bottom portion 310 or the sidewall portion 320 may extend bent to define the sidewall portion 320 and the bottom portion 310, respectively.

The first sidewall 321 is lengthwise extended substantially parallel to one side of the display panel 100, to which the flexible printed circuit board 130 is attached, and most adjacent to the one side of the display panel 100. A portion of the first sidewall 321 is inclined with respect to the bottom portion 310. An angle between the inclined portion of the first sidewall 321 and the bottom portion 310 may be an obtuse angle.

The second to fourth sidewalls 322 to 324 extend in the third direction DR3 from the bottom portion 310.

The reflective sheet 400 is disposed on the bottom portion 310 and disposed under the light sources 500. The reflective sheet 400 reflects most of the light incident thereto.

The backlight unit BLU may further include a driving substrate (not shown). The driving substrate (not shown) is disposed between the bottom portion 310 and the reflective sheet 400. The driving substrate (not shown) is electrically connected to the light sources 500 to apply a driving signal to the light sources 500. The driving substrate (not shown) may be provided in a plural number.

The light sources 500 are accommodated in the bottom cover 300 in a space formed by the bottom portion 310 and the sidewall portion 320 thereof. The light sources 500 are disposed on the reflective sheet 400. Since the light sources 500 are provided in a direct-illumination type backlight unit, the light emitted from the light sources 500 is directly incident to the diffusion plate 700 without passing through a light guide plate.

Each of the light sources 500 may be, but not limited to, a cold cathode fluorescent lamp ("CCFL"), a flat fluorescent lamp ("FFL") or a point light source such as a light emitting diode ("LED"). Hereinafter, the light emitting diode will be described as the light sources 500.

The light sources 500 may include white light sources emitting a white light, but should not be limited thereto or thereby. That is, the light sources 500 may include a red light source emitting a red light, a green light source emitting a green light and/or a blue light source emitting a blue light.

The middle mold 600 includes a horizontal supporting portion 610, a distance maintaining portion 620, an inclined portion 630, a vertical supporting portion 640 and an expansion portion 650. In an exemplary embodiment, the vertical supporting portion 640 with or without the inclined portion 630 may define a sidewall of the middle mold 600.

The horizontal supporting portion 610 is substantially parallel to the bottom portion 310. The horizontal supporting portion 610 supports the diffusion plate 700 thereon. The distance maintaining portion 620 may be parallel to the vertical supporting portion 640. A transition of the middle mold 600 from the distance maintaining portion 620 to the vertical supporting portion 640 is defined by the inclined portion 630.

The distance maintaining portion 620 is connected to a first end of the horizontal supporting portion 610. The distance maintaining portion 620 supports the optical sheets 800 thereon. The distance maintaining portion 620 extends in the third direction DR3 from the horizontal supporting portion 610. The distance maintaining portion 620 allows the diffusion plate 700 to be spaced apart from the optical sheets 800 in the third direction DR3. A length in the third direction DR3 of the distance maintaining portion 620 is greater than a sum of a maximum thickness of the diffusion plate 700 and a maximum thickness of the horizontal supporting portion 610.

Where the distance maintaining portion 620 extends in a direction other than the third direction DR3, a brightness at an edge of the display area DA becomes relatively lower than at a center of the display area DA. However, in one or more exemplary embodiment, since the distance maintaining portion 620 of the middle mold 600 extends in the third direction DR3, the brightness at the edge of the display area DA being relatively lower than at the center thereof may be reduce or effectively prevented. Consequently, a brightness uniformity of the display area DA may be improved.

The distance maintaining portion 620 is spaced apart from the diffusion plate 700 in the first and second directions DR1 and DR2. Distances D1 and D2 between the distance maintaining portion 620 and an end surface (or edge) of the diffusion plate 700 provide a space in which the diffusion plate 700 may expand in the first and second directions DR1 and DR2. Since the distance maintaining portion 620 and the diffusion plate 700 are spaced apart from each other, the diffusion plate 700 is not damaged even though the diffusion plate 700 may expand in the first or second directions DR1 or DR2.

The distance maintaining portion 620 reduces or effectively prevents a light leakage phenomenon of the light passing through the diffusion plate 700 from occurring. In detail, a light incident to the distance maintaining portion 620 among the light passing through the diffusion plate 700 is blocked by the distance maintaining portion 620.

Among the first to fourth sidewalls 321 to 324 of the bottom cover, 300, the distance maintaining portion 620 is supported by two sidewalls adjacent to each other and not supported by remaining sidewalls. In the illustrated exemplary embodiment, referring to FIGS. 3 and 4, the distance maintaining portion 620 is supported by the third and fourth sidewalls 323 and 324 and not supported by the first and second sidewalls 321 and 322. As used herein, "supported" may indicate a directly adjacent and/or contacting relationship between features.

The inclined portion 630 extends from an opposing second end of the horizontal supporting portion 610 and is inclined with respect to the horizontal supporting portion 610. The inclined portion 630 forms an obtuse angle with the horizontal supporting portion 610. The vertical supporting portion 640 extends in a direction opposite to the third direction DR3 from a distal end of the inclined portion 630 and makes contact with the reflective sheet 400.

The expansion portion 650 extends in a direction approaching the top cover 200 from the distance maintaining portion 620. Among the first to fourth sidewalls 321 to 324 of the bottom cover, 300, the expansion portion 650 is supported by two sidewalls adjacent to each other and not supported by remaining sidewalls. In the illustrated exemplary embodiment, the expansion portion 650 is supported by the first and second sidewalls 321 and 322 and not supported by the third and fourth sidewalls 323 and 324. As used herein, "supported" may indicate a directly adjacent and/or contacting relationship between features.

In the illustrated exemplary embodiment, the horizontal supporting 610, the distance maintaining portion 620, the inclined portion 630, the vertical supporting portion 640 and the expansion portion 650 may be integrally formed with each other to define the middle mold 600 as a single unit. That is, the horizontal supporting portion 610, the distance maintaining portion 620, the inclined portion 630, the vertical supporting portion 640 and the expansion portion 650 may include the same material and may be formed in a single process. To define a single unitary middle mold 600, any one of the aforementioned portions of the middle mold 600 may be considered as extended to define another portion of the middle mold 600.

The diffusion plate 700 is disposed on the horizontal supporting portion 610. The diffusion plate 700 uniformly diffuses the light emitted from the light sources 500. That is, the diffusion plate 700 diffuses the light incident thereto from the light sources 500 to reduce or effectively prevent concentration of the light. Although not shown in figures, an adhesive layer may be provided between the diffusion plate 700 and the horizontal supporting portion 610.

The optical sheets 800 are disposed on the distance maintaining portion 620. The optical sheets 800 include a diffusion sheet 810, a prism sheet 820 and a protective sheet 830. The diffusion sheet 810 diffuses the light incident thereto. The prism sheet 820 enhances the brightness of the diffused light. The protective sheet 830 protects the prism sheet and secures a viewing angle. In the illustrated exemplary embodiment, the optical sheets 800 collectively include three optical individual sheets, but the optical sheets 800 may include four or more sheets according to other exemplary embodiments. In addition, the optical sheets 800 may include only the prism sheet 820 and the protective sheet 830 without including the diffusion sheet 810.

Among the optical sheets 800, an optical sheet disposed at an uppermost position, e.g., the protective sheet 830 shown in FIGS. 1 to 4, makes contact with the display panel 100.

The diffusion plate 700 and the optical sheets 800 are spaced apart from each other by a predetermined distance D3 in the third direction DR3 by the distance maintaining portion 620. Accordingly, although the diffusion plate 700 may make contact with the optical sheets 800 while the display device 1000 or the backlight assembly BLU is in transit, prolonged contact or grinding by friction between the diffusion plate 700 and the optical sheets 800 may be reduced or effectively prevented.

The top cover 200 disposed outside the bottom cover 300 forms a space with the inclined portion of the first sidewall 321. In the top plan view, the space is within edges or a boundary defined by the top cover 200.

The display device 1000 may further include a holder HD. The holder HD is disposed outside the bottom cover 300 of the backlight unit BLU. The holder HD is disposed within the space defined between the top cover 200 and the bottom cover 300. A portion of the holder HD is extended to be inserted into and fixed to a hole HL formed through the first sidewall 321. In detail, the hole HL is provided in a plural number and the holes HL are formed through the first sidewall 321 and spaced apart from each other along a length of the first sidewall 321. The flexible printed circuit board 130 extended from the display panel 100 and bent to the first sidewall 321 and the printed circuit board 140 connected to the bent flexible printed circuit board 140 is accommodated in the holder HD.

Where the printed circuit board 140 is disposed under the bottom cover 300, an overall thickness of the display device 1000 may become undesirably thick. In the illustrated exemplary embodiment, the printed circuit board 140 is accommodated in the holder HD and disposed at an outer side surface of the bottom cover 300, and thus the overall thickness of the display device 1000 may be reduced.

The display device 1000 may further include a spacer SP. The spacer SP is disposed between the front surface cover 210 and the display panel 100. The spacer SP is disposed along the edge of the display panel 100. The spacer SP includes or is formed of a material having elasticity, e.g., phorone, urethane, etc.

The spacer SP reduced or effectively prevents the light leakage, which is caused by the light incident to the top cover 200 after passing through the optical sheets 800 and the display panel 100, from occurring. In detail, the spacer SP blocks the light incident to the top cover 200 among the light passing through the optical sheets 800 and the display panel 100.

Figure 5:
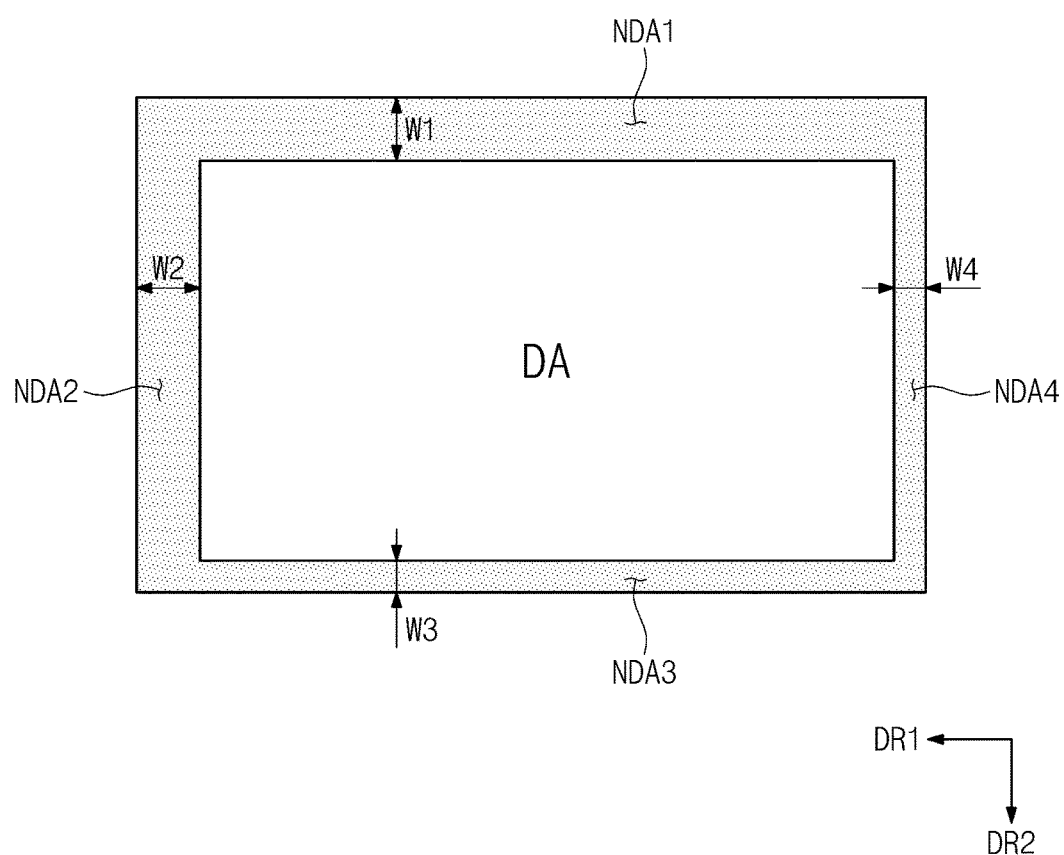
FIG. 5 is a top plan view showing an exemplary embodiment of a display device according to the invention.

FIG. 5 is a top plan view showing an exemplary embodiment of a display device according to the invention.

Referring to FIG. 5, the display device 1000 includes a display area DA having the quadrangular shape and first, second, third and fourth non-display areas NDA1, NDA2, NDA3 and NDA4 provided along sides of the display area DA. The display area DA of FIG. 5 is overlapped with and corresponds to the display area DA of the display panel 100 shown in FIG. 1. The first to fourth non-display areas NDA1 to NDA4 are overlapped with and correspond to the non-display area NDA of the display panel 100 shown in FIG. 1. The first to fourth non-display areas NDA1 to NDA4 of FIG. 5 may define a whole of the non-display area NDA in FIG. 1.

The first and second non-display areas NDA1 and NDA2 are respectively overlapped with the first and second sidewalls 321 and 322 of the bottom cover 300 and the third and fourth non-display areas NDA3 and NDA4 are respectively overlapped with the third and fourth sidewalls 323 and 324 of the bottom cover 300. In an exemplary embodiment, widths of the non-display areas of FIG. 5 may correspond to a maximum distance from an outer edge of the top cover 200 to a closest sidewall of the bottom cover 300 and/or to a closest sidewall of the middle mold 600 in a top plan view of the display apparatus 1000.

Widths W1 and W2 of the first and second non-display areas NDA1 and NDA2 may be greater than widths W3 and W4 of the third and fourth non-display areas NDA3 and NDA4. The width W1 of the first non-display area NDA1 may be equal to the width W2 of the second non-display area NDA2. The width W3 of the third non-display area NDA3 may be equal to the width W4 of the fourth non-display area NDA4. A width of a non-display area may be a maximum width thereof in a direction perpendicular to a length direction thereof.

A sum of the width W1 of the first non-display area NDA1 and the width W3 of the opposing third non-display area NDA3 may be equal to a sum of the width W2 of the second non-display area NDA2 and the width W4 of the opposing fourth non-display area NDA4.

One or more exemplary embodiment of the middle mold 600 according to the invention includes the distance maintaining portion 620 supported by the third and fourth sidewalls 323 and 324 and the expansion portion 650 supported by the first and second sidewalls 321 and 322. Due to the structure of the middle mold 600 according to the invention, the width of each of the first to fourth non-display areas NDA1 to NDA4 may be minimized, and the widths W1 and W2 of the first and second non-display areas NDA1 and NDA2 may be set to be greater than each of the widths W3 and W4 of the third and fourth non-display areas NDA3 and NDA4.

Figure 6:
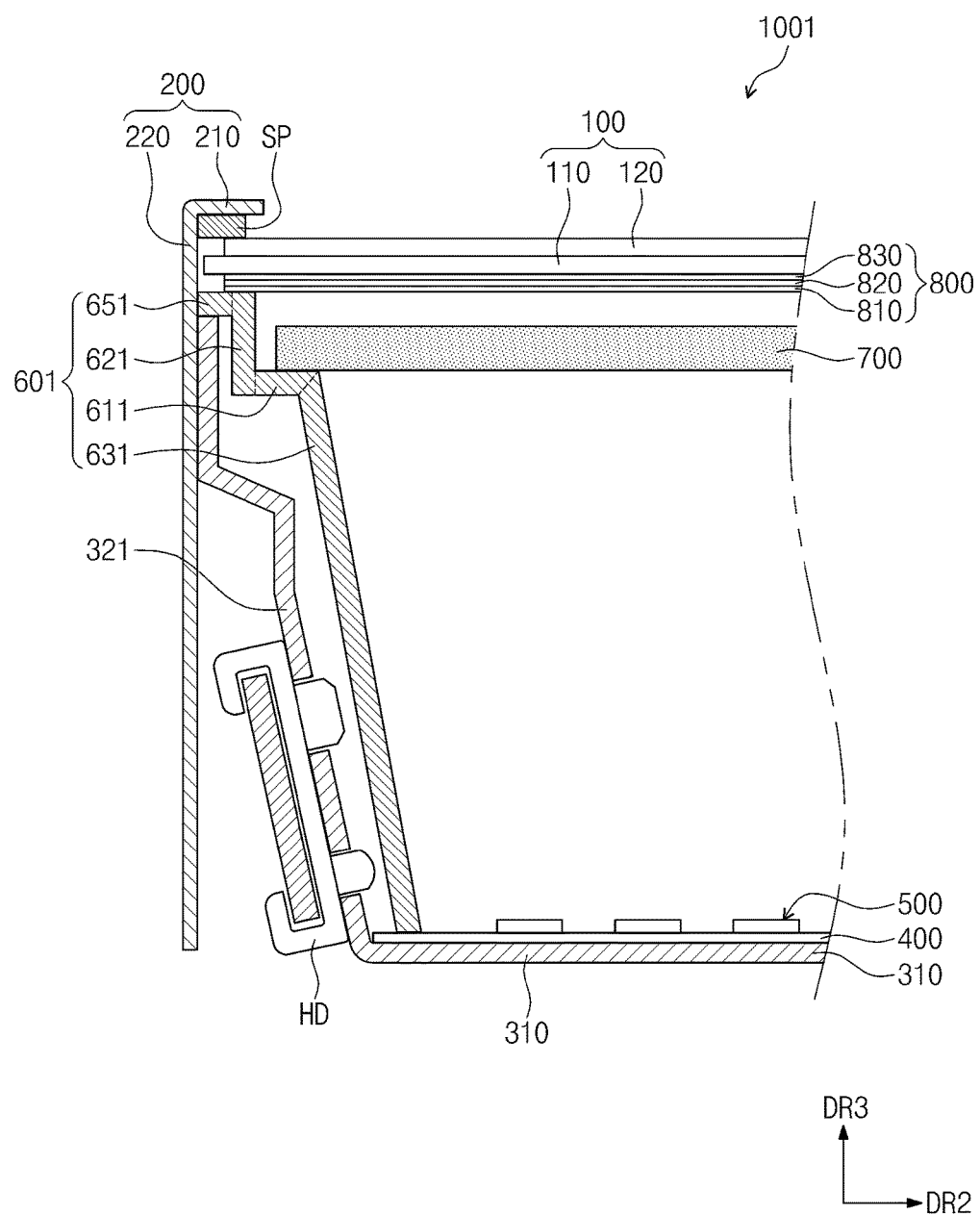
FIGS. 6 to 8 are cross-sectional views showing modified exemplary embodiments of display devices according to the invention.
Figure 7:
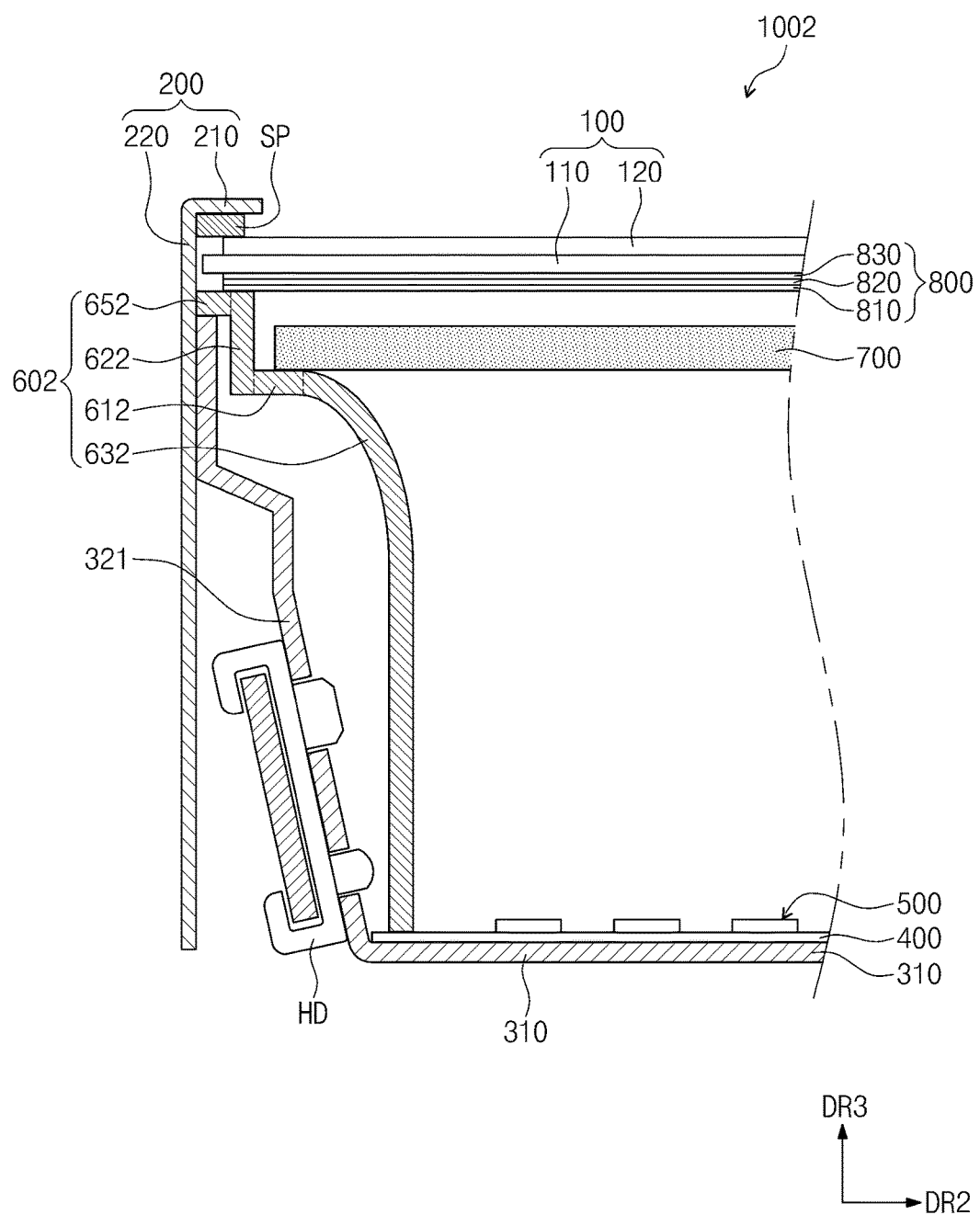
Figure 8:
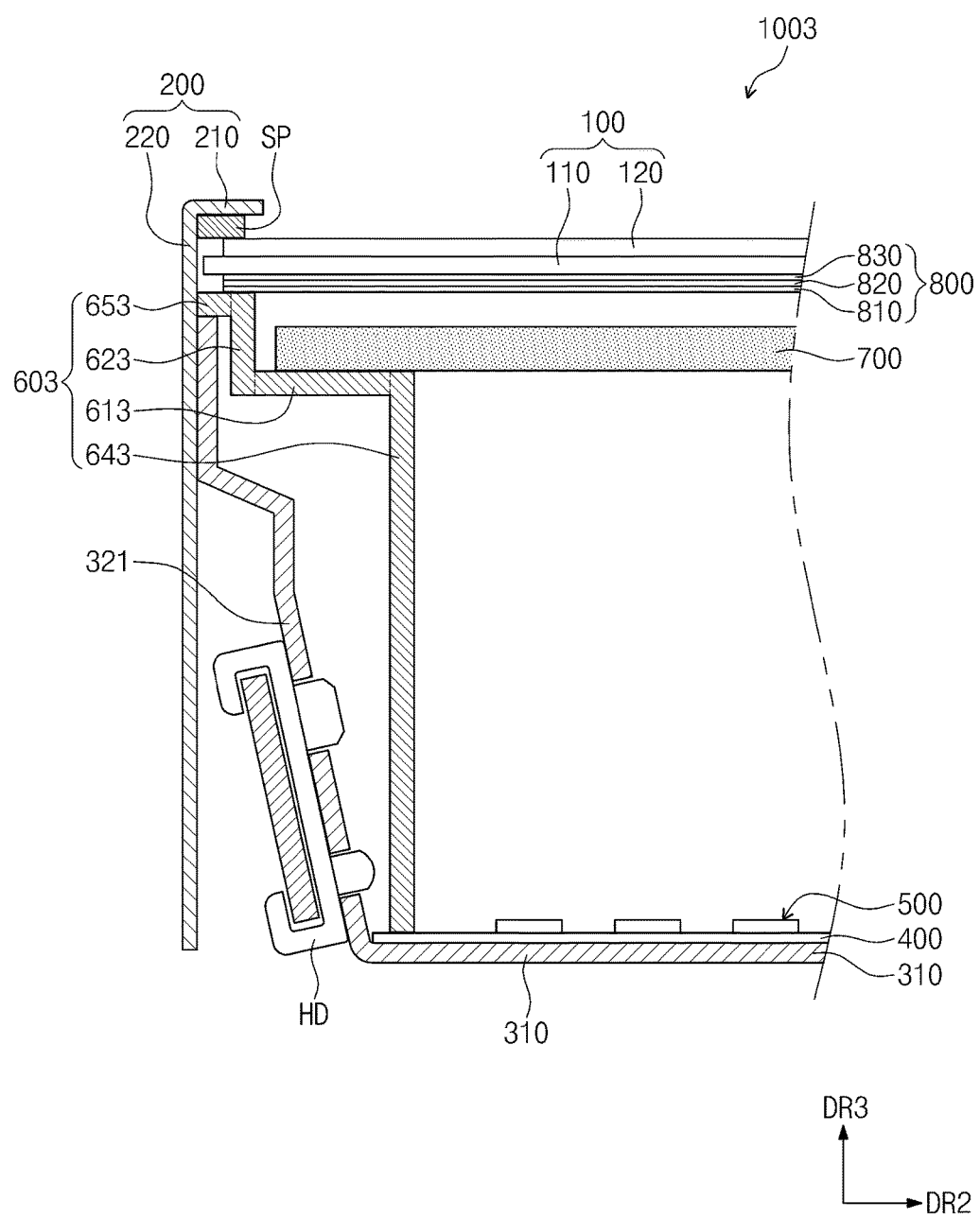

FIGS. 6 to 8 are cross-sectional views showing modified exemplary embodiments of display devices according to the invention.

Display devices 1001, 1002 and 1003 respectively shown in FIGS. 6, 7 and 8 may have the same structure and function as those of the display device 1000 shown in FIGS. 1 to 4 except for a shape of a middle mold. Hereinafter, the middle mold will be described in detail with reference to FIGS. 6 to 8.

Referring to FIG. 6, the middle mold 601 includes a horizontal supporting portion 611, a distance maintaining portion 621, an inclined portion 631 and an expansion portion 651.

The horizontal supporting portion 611, the distance maintaining portion 621 and the expansion portion 651 may be substantially the same as the horizontal supporting portion 610, the distance maintaining portion 620 and the expansion portion 650 shown in FIGS. 1 to 4.

The inclined portion 631 extends from the opposing second end of the horizontal supporting portion 611 to make contact with the reflective sheet 400. The inclined portion 631 forms an obtuse angle with the horizontal supporting portion 610. The inclined portion 631 has a constant slope over an entire portion thereof. In an exemplary embodiment, the inclined portion 631 may define a sidewall of the middle mold 601. The horizontal supporting portion 611 transitions directly to the inclined portion 631 without an intervening portion.

The horizontal supporting portion 611, the distance maintaining portion 621, the inclined portion 631 and the expansion portion 651 may be integrally formed with each other to define the middle mold 601 as a single unit. That is, the horizontal supporting portion 611, the distance maintaining portion 621, the inclined portion 631 and the expansion portion 651 may include the same material and may be formed in a single process. To define a single unitary middle mold 601, any one of the aforementioned portions of the middle mold 601 may be considered as extended to define another portion of the middle mold 601.

Referring to FIG. 7, the middle mold 602 includes a horizontal supporting portion 612, a distance maintaining portion 622, an inclined portion 632 and an expansion portion 652.

The horizontal supporting portion 612, the distance maintaining portion 622 and the expansion portion 652 may be substantially the same as the horizontal supporting portion 610, the distance maintaining portion 620 and the expansion portion 650 shown in FIGS. 1 to 4.

The inclined portion 632 extends from the opposing second end of the horizontal supporting portion 612 to make contact with the reflective sheet 400. The inclined portion 632 has a curved shape. In an exemplary embodiment, the inclined portion 632 may define a sidewall of the middle mold 602. The sidewall may include a curved portion which extends from the opposing second end of the horizontal supporting portion 612 and a vertical supporting portion which makes contact with the reflective sheet 400. The inclined portion 632 is curved such that the extension direction thereof becomes close to the third direction DR3 as a distance from the horizontal supporting portion 612 increases. The distance maintaining portion 622 may be parallel to the vertical supporting portion. A transition of the middle mold 602 from the horizontal supporting portion 612 to the vertical supporting portion is defined by the curved portion of the inclined portion 632.

The horizontal supporting portion 612, the distance maintaining portion 622, the inclined portion 632 and the expansion portion 652 may be integrally formed with each other to define the middle mold 602 as a single unit. That is, the horizontal supporting portion 612, the distance maintaining portion 622, the inclined portion 632 and the expansion portion 652 may include the same material and may be formed in a single process. To define a single unitary middle mold 602, any one of the aforementioned portions of the middle mold 602 may be considered as extended to define another portion of the middle mold 602.

Referring to FIG. 8, the middle mold 603 includes a horizontal supporting portion 613, a distance maintaining portion 623, a vertical supporting portion 643 and an expansion portion 653.

The horizontal supporting portion 613, the distance maintaining portion 623 and the expansion portion 653 may be substantially the same as the horizontal supporting portion 610, the distance maintaining portion 620 and the expansion portion 650 shown in FIGS. 1 to 4.

The vertical supporting portion 643 extends from the opposing second end of the horizontal supporting portion 613 in a direction opposite to the third direction DR3 to make contact with the reflective sheet 400. The distance maintaining portion 623 may be parallel to the vertical supporting portion 643. The horizontal supporting portion 613 transitions directly to the vertical supporting portion 643. The vertical supporting portion 643 is perpendicular over an entirety thereof with respect to the bottom portion 310.

The horizontal supporting portion 613, the distance maintaining portion 623, the vertical supporting portion 642 and the expansion portion 653 may be integrally formed with each other to define the middle mold 603 as a single unit. That is, the horizontal supporting portion 613, the distance maintaining portion 623, the vertical supporting portion 643 and the expansion portion 653 may include the same material and may be formed in a single process. To define a single unitary middle mold 603, any one of the aforementioned portions of the middle mold 603 may be considered as extended to define another portion of the middle mold 603.

Figures 9, 10:
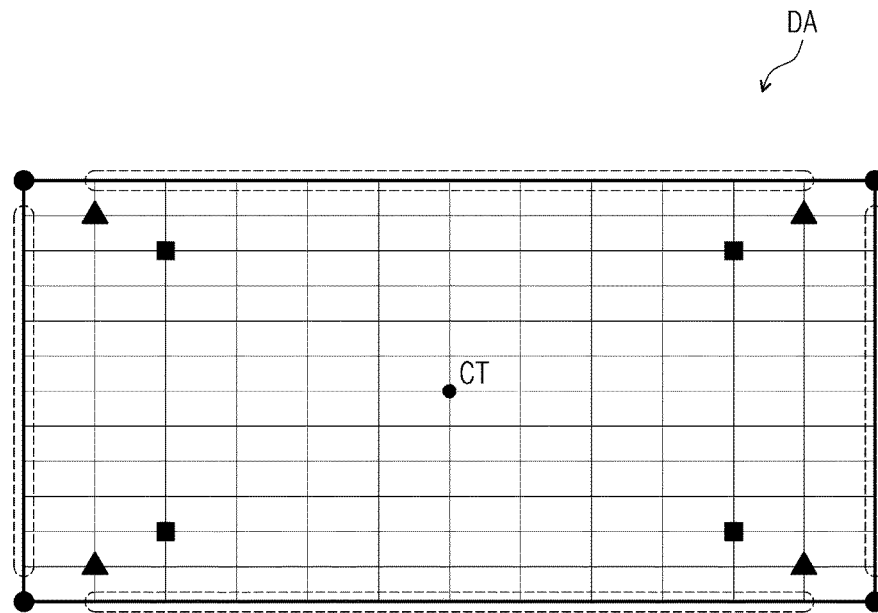
FIG. 9 is a top plan view showing an exemplary embodiment of a display area of a display device, in which measuring positions are shown, according to the invention.
FIG. 10 is a chart comparing brightness ratios with respect to a center position of the measuring positions in FIG. 9.

FIG. 9 is a top plan view showing an exemplary embodiment of a display area of a display device, in which measuring positions are shown, according to the invention and FIG. 10 is a chart comparing brightness ratios with respect to a center position of the measuring positions in FIG. 9.

For the convenience of explanation, FIG. 9 shows the overall display area DA of the display device excluding the non-display area NDA thereof. The display area DA is divided in rectangles arranged in a matrix form of 12 rows by 12 columns by the lines indicated in FIG. 9.

In FIG. 9, a first position may be vertices of a quadrangle defined by rectangles arranged in a matrix form of 8 rows by 8 columns such that a center position CT is disposed in the middle of the quadrangle. In FIG. 9, the first position is indicated by a black quadrangle (■). A second position may be vertices of a quadrangle defined by rectangles arranged in a matrix form of 10 rows by 10 columns such that the center position CT is disposed in the middle of the quadrangle. In FIG. 9, the second position is indicated by a black triangle (▲). A third position may be vertices of a quadrangle defined by rectangles arranged in a matrix form of 12 rows by 12 columns such that the center position CT is disposed in the middle of the quadrangle. In FIG. 9, the third position is indicated by a black circle (●). A fourth position may be sides of the overall quadrangle defined by rectangles arranged in the matrix form of 12 rows by 12 columns such that the center position CT is disposed in the middle of the quadrangle. In FIG. 9, the fourth position is indicated by a closed dotted oval.

The ratio of the brightness of the first position with respect to the brightness of the center position CT is about 91.5%, the ratio of the brightness of the second position with respect to the brightness of the center position CT is about 85.4%, the ratio of the brightness of the third position with respect to the brightness of the center position CT is about 78.8%, and the ratio of the brightness of the fourth position with respect to the brightness of the center position CT is about 81.3%.

When considering that the brightness of the measuring position decreases as a distance from the center position CT increases, one or more exemplary embodiment of the display device according to the invention may display the brightness equal to or greater than about 78.8% of a maximum brightness regardless of the measuring position along the display area DA. That is, the brightness uniformity of the display device according to the invention may be improved.

Figure 11:
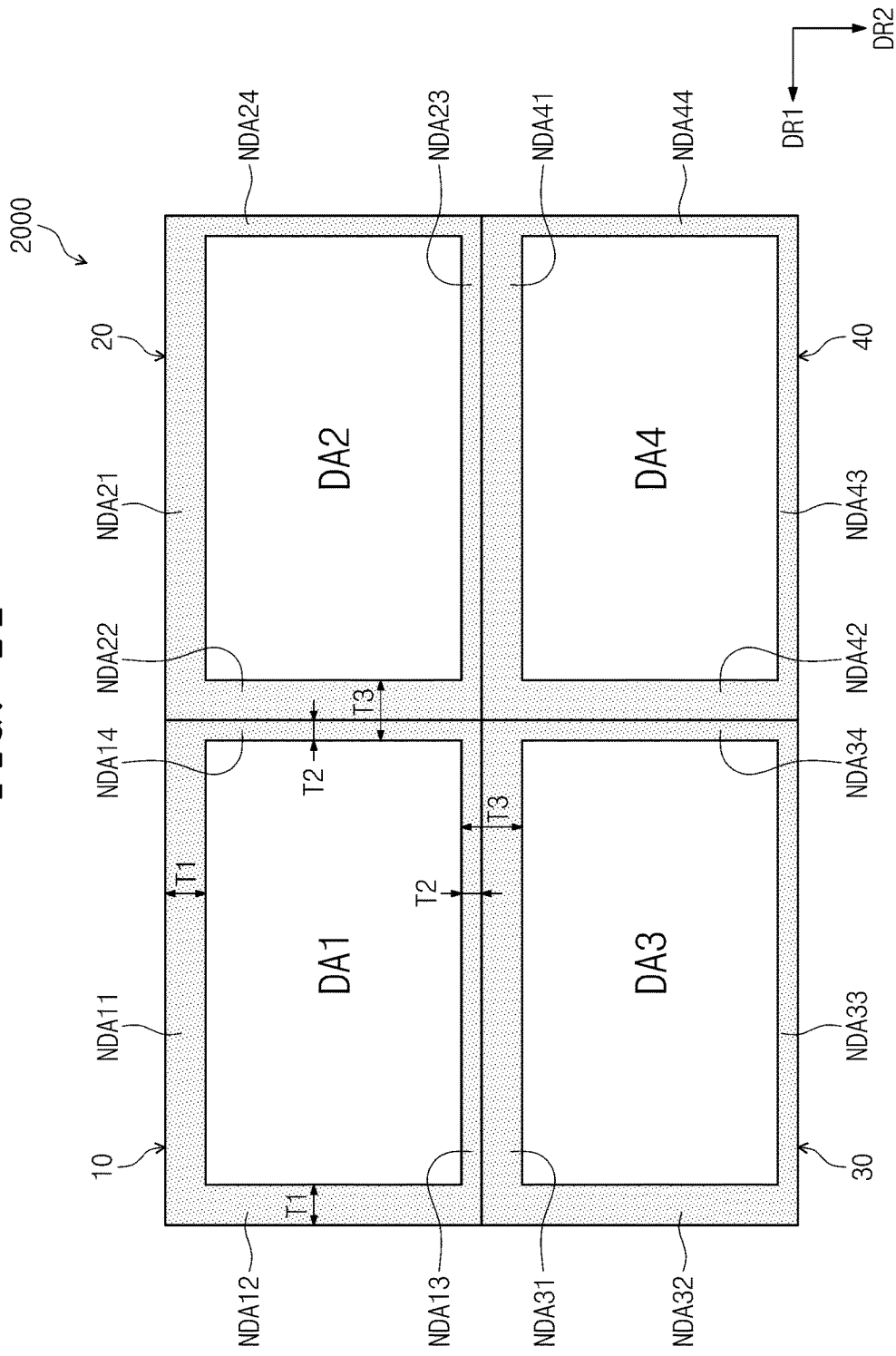
FIG. 11 is a view showing an exemplary embodiment of a digital information display ("DID") system employing a display device according to the invention.

FIG. 11 is a view showing an exemplary embodiment of a digital information display ("DID") system 2000 employing a display device provided in plural according to the invention.

FIG. 11 shows the DID system 2000 including first, second, third and fourth display devices 10, 20, 30 and 40 arranged in a matrix form of two rows by two columns, but the number of the display devices included in the DID system 2000 and the arrangement of the display devices should not be limited thereto or thereby.

Each of the first to fourth display devices 10 to 40 includes a display area and first to fourth non-display areas which are disposed at respective sides of the display area. For instance, the first display device 10 includes a display area DA1 and first to fourth non-display areas NDA11 to NDA14, the second display device 20 includes a display area DA2 and first to fourth non-display areas NDA21 to NDA24, the third display device 30 includes a display area DA3 and first to fourth non-display areas NDA31 to NDA34, and the fourth display device 40 includes a display area DA4 and first to fourth non-display areas NDA41 to NDA44.

Widths T1 of the first non-display areas NDA11, NDA21, NDA31 and NDA41 are substantially the same as widths T1 of the second non-display areas NDA12, NDA22, NDA32 and NDA42, and widths T2 of the third non-display areas NDA13, NDA23, NDA33 and NDA43 are substantially the same as widths T2 of the fourth non-display areas NDA14, NDA24, NDA34 and NDA44.

A length T3 in the first direction DR1 between the display areas DA1 and DA2 of the first and second display devices 10 and 20 adjacent to each other is substantially the same as a length T3 in the second direction DR2 between the display areas DA1 and DA3 of the first and third display devices 10 and 30 adjacent to each other. Similarly, a length or distance T3 in the first direction DR1 between the display areas DA3 and DA4 of the third and fourth display devices 30 and 40 adjacent to each other is substantially the same as a length or distance T3 in the second direction DR2 between the display areas DA2 and DA4 of the second and fourth display devices 20 and 40 adjacent to each other.

According to the DID system 2000 including the display devices 10 to 40 of the present disclosure, the length between the display areas among the display devices 10 to 40 adjacent to each other in the first direction DR1 may be substantially the same as the length between the display areas among the display devices 10 to 40 adjacent to each other in the second direction DR2.

Although exemplary embodiment of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel which displays an image with light; and
   a backlight unit which is disposed facing the display panel and provides the light to the display panel, the backlight unit comprising:
      a bottom cover defining a bottom portion thereof and a plurality of sidewall portions thereof which are protruded from the bottom portion, a sidewall portion among the plurality of sidewall portions forming an obtuse angle with the bottom portion;
      a light source accommodated in the bottom cover;
      a middle mold supported by the bottom cover and defining at the sidewall portion forming the obtuse angle with the bottom portion:
         a horizontal supporting portion thereof,
         a distance maintaining portion thereof extending from a first end of the horizontal supporting portion in a direction perpendicular to the bottom portion of the bottom cover, and
         an inclined portion thereof extending inclined with respect to the horizontal supporting portion from a second end thereof opposite to the first end, a diffusion plate overlapping the horizontal supporting portion; and
      an optical sheet which does not polarize a light incident thereto, the optical sheet overlapping the distance maintaining portion, and spaced apart from the diffusion plate with an air gap therebetween by the distance maintaining portion,
      wherein in the direction perpendicular to the bottom portion of the bottom cover, each of the horizontal supporting portion and the inclined portion of the middle mold are spaced apart from the sidewall portion forming the obtuse angle with the bottom portion.

2. The display device of claim 1, wherein the horizontal supporting portion of the middle mold is parallel to the bottom portion of the bottom cover.

3. The display device of claim 1, wherein the distance maintaining portion of the middle mold is spaced apart from the diffusion plate in a direction parallel to the bottom portion of the bottom cover.

4. The display device of claim 1, wherein the horizontal supporting portion extends bent at the first end thereof to define the distance maintaining portion extending in the direction perpendicular to the bottom portion of the bottom cover.

5. The display device of claim 1, wherein the display panel is disposed on the optical sheet and an upper surface of the optical sheet contacts the display panel.

6. The display device of claim 1, wherein
   the horizontal supporting portion of the middle mold extends bent at the first end thereof to define the distance maintaining portion extending in the direction perpendicular to the bottom portion of the bottom cover;
   the horizontal supporting portion extends bent at the second end thereof opposite to the first end to define the inclined portion of the middle mold extending inclined with respect to the horizontal supporting portion;
   the inclined portion extends bent at a distal end thereof to define a vertical supporting portion of the middle mold extending perpendicular to the bottom portion of the bottom cover; and
   the distance maintaining portion extends bent at a distal end thereof to define an expansion portion of the middle mold extending parallel to the bottom portion of the bottom cover.

7. The display device of claim 1, wherein
   the horizontal supporting portion of the middle mold extends bent at the first end thereof to define the distance maintaining portion extending in the direction perpendicular to the bottom portion of the bottom cover;
   the horizontal supporting portion extends bent at the second end thereof opposite to the first end to define the inclined portion of the middle mold extending inclined over an entirety thereof at a constant slope to the bottom portion of the bottom cover; and
   the distance maintaining portion extends bent at a distal end thereof to define an expansion portion of the middle mold extending parallel to the bottom portion of the bottom cover.

8. The display device of claim 1, wherein
   the horizontal supporting portion of the middle mold extends bent at the first end thereof to define the distance maintaining portion extending in the direction perpendicular to the bottom portion of the bottom cover;
   the horizontal supporting portion extends bent at the second end thereof opposite to the first end to define the inclined portion of the middle mold having a curved shape extending toward the bottom portion of the bottom cover; and
   the distance maintaining portion extends bent at a distal end thereof to define an expansion portion of the middle mold extending parallel to the bottom portion.

9. The display device of claim 1, wherein
   the horizontal supporting portion of the middle mold extends bent at the first end thereof to define the distance maintaining portion extending in the direction perpendicular to the bottom portion of the bottom cover;
   the horizontal supporting portion extends bent at the second end thereof opposite to the first end to define a vertical supporting portion of the middle mold extending perpendicular to the bottom portion; and
   the distance maintaining portion extends bent at a distal end thereof to define an expansion portion of the middle mold extending parallel to the bottom portion of the bottom cover.

10. The display device of claim 1, wherein
the bottom portion of the bottom cover has a quadrangular shape,
the bottom portion extends bent from each of four sides thereof to define the sidewall portions of the bottom cover comprising first, second, third and fourth sidewalls, respectively, and
at least one of the first to fourth sidewalls forms the obtuse angle with the bottom portion.

11. The display device of claim 10, further comprising a holder disposed on an outer surface of the bottom cover,
wherein the first sidewall of the bottom cover forms the obtuse angle with the bottom portion and the holder is coupled with the first sidewall.

12. The display device of claim 11, wherein a plurality of holes is defined in the first sidewall which forms the obtuse angle with the bottom portion and a portion of the holder extends into the holes to fix the holder to the first sidewall.

13. The display device of claim 11, further comprising:
a printed circuit board electrically connected to the display panel; and
a flexible printed circuit board electrically connecting the display panel and the printed circuit board to each other,
wherein the flexible printed circuit board is bent from the display panel and toward the first sidewall which forms the obtuse angle with the bottom portion to dispose the printed circuit board in the holder.

14. The display device of claim 11, wherein
among the first, second, third and fourth sidewalls of the bottom cover for which the first sidewall forms the obtuse angle with the bottom portion, the first and second sidewalls are adjacent to each other and the third and fourth sidewalls are adjacent to each other, and
the distance maintaining portion of the middle mold is spaced apart from the first and second sidewalls adjacent to each other in a direction parallel to the bottom portion of the bottom cover, and directly contacts the third and fourth sidewalls adjacent to each other.

15. The display device of claim 14, wherein
the display device comprises:
a display area having a quadrangular shape defining four sides of the display area, and
first, second, third and fourth non-display areas of which lengths thereof are extended along the four sides of the display area,
the first to fourth non-display areas are respectively overlapped with the first to fourth sidewalls of the bottom cover, and
widths of the first and second non-display areas are each greater than widths of the third and fourth non-display areas, the widths taken perpendicular to the lengths thereof.

16. The display device of claim 15, wherein
the width of the first non-display area is equal to the width of the second non-display area, and
the width of the third non-display area is equal to the width of the fourth non-display area.

17. The display device of claim 16, wherein a sum of the width of the first non-display area and the width of the third non-display area is equal to a sum of the width of the second non-display area and the width of the fourth non-display area.

18. The display device of claim 1, further comprising a top cover covering an edge of the display panel and coupled with the backlight unit.

19. The display device of claim 18, further comprising a spacer disposed between the top cover and the display panel and disposed along the edge of the display panel.

20. A display device comprising:
a display panel which displays an image with light; and
a backlight unit which is disposed facing the display panel and provides the light to the display panel, the backlight unit comprising:
a bottom cover defining a bottom portion thereof and a plurality of sidewall portions thereof which are protruded from the bottom portion, a sidewall portion among the plurality of sidewall portions forming an obtuse angle with the bottom portion;
a light source accommodated in the bottom cover;
a middle mold supported by the bottom cover and defining at the sidewall portion forming the obtuse angle with the bottom portion:
a horizontal supporting portion thereof, and
a distance maintaining portion thereof extending from a first end of the horizontal supporting portion in a direction perpendicular to the bottom portion of the bottom cover;
a diffusion plate overlapping the horizontal supporting portion; and
an optical sheet which does not polarize a light incident thereto, the optical sheet overlapping the distance maintaining portion, and spaced apart from the diffusion plate with an air gap therebetween by the distance maintaining portion,
wherein in the direction perpendicular to the bottom portion of the bottom cover, the horizontal supporting portion overlapped by the diffusion plate is disposed between the diffusion plate and the sidewall portion which forms the obtuse angle with the bottom portion.

21. A display device comprising:
a display panel which displays an image with light; and
a backlight unit which is disposed facing the display panel and provides the light to the display panel, the backlight unit comprising:
a bottom cover defining a bottom portion thereof and a plurality of sidewall portions thereof which are protruded from the bottom portion, a sidewall portion among the plurality of sidewall portions forming an obtuse angle with the bottom portion;
a light source accommodated in the bottom cover;
a middle mold supported by the bottom cover and defining at the sidewall portion forming the obtuse angle with the bottom portion:
a horizontal supporting portion thereof, and
a distance maintaining portion thereof extending from a first end of the horizontal supporting portion in a direction perpendicular to the bottom portion of the bottom cover;
a diffusion plate overlapping the horizontal supporting portion; and
an optical sheet which does not polarize a light incident thereto, the optical sheet overlapping the distance maintaining portion, and spaced apart from the diffusion plate with an air gap therebetween by the distance maintaining portion; and
a circuit board electrically connected to the display panel, disposed extended along the sidewall portion which forms the obtuse angle with the bottom portion,
wherein in the direction perpendicular to the bottom portion of the bottom cover, the horizontal supporting portion overlapped by the diffusion plate is disposed between the diffusion plate and the sidewall portion which forms the obtuse angle with the bottom portion and along which the circuit board is disposed.

22. A display device comprising:
a display panel which displays an image with light; and
a backlight unit which is disposed facing the display panel and provides the light to the display panel, the backlight unit comprising:
  a bottom cover defining a bottom portion thereof and a plurality of sidewall portions thereof which are protruded from the bottom portion, a sidewall portion among the plurality of sidewall portions forming an obtuse angle with the bottom portion;
  a light source accommodated in the bottom cover;
  a middle mold supported by the bottom cover and defining at the sidewall portion forming the obtuse angle with the bottom portion:
    a horizontal supporting portion thereof, and
    a distance maintaining portion thereof extending from a first end of the horizontal supporting portion in a direction perpendicular to the bottom portion of the bottom cover;
  a diffusion plate overlapping the horizontal supporting portion; and
  an optical sheet which does not polarize a light incident thereto, the optical sheet overlapping the distance maintaining portion, and spaced apart from the diffusion plate with an air gap therebetween by the distance maintaining portion; and
  a circuit board electrically connected to the display panel, disposed extended along the sidewall portion which forms the obtuse angle with the bottom portion,
wherein in the direction perpendicular to the bottom portion of the bottom cover, the sidewall portion which forms the obtuse angle with the bottom portion is disposed between the circuit board and the horizontal supporting portion overlapped by the diffusion plate.

23. A display device comprising:
a display panel which displays an image with light; and
a backlight unit which is disposed facing the display panel and provides the light to the display panel, the backlight unit comprising:
  a bottom cover defining a bottom portion thereof and a plurality of sidewall portions thereof which are protruded from the bottom portion, a sidewall portion among the plurality of sidewall portions forming an obtuse angle with the bottom portion;
  a light source accommodated in the bottom cover;
  a middle mold supported by the bottom cover and defining:
    a horizontal supporting portion thereof, and
    a distance maintaining portion thereof extending from a first end of the horizontal supporting portion in a direction perpendicular to the bottom portion of the bottom cover;
  a diffusion plate overlapping the horizontal supporting portion; and
  an optical sheet which does not polarize a light incident thereto, the optical sheet overlapping the distance maintaining portion, and spaced apart from the diffusion plate with an air gap therebetween by the distance maintaining portion,
wherein at the sidewall portion forming the obtuse angle with the bottom portion, in a direction parallel to the bottom portion of the bottom cover, the distance maintaining portion overlapped by the optical sheet is spaced apart from the bottom portion of the bottom cover.

\* \* \* \* \*